(12) United States Patent
Wilhide et al.

(10) Patent No.: US 10,205,321 B2
(45) Date of Patent: Feb. 12, 2019

(54) ELECTRICAL ACCUMULATORS FOR MULTILEVEL POWER SYSTEMS

(71) Applicant: Hamilton Sundstrand Corporation, Charlotte, NC (US)

(72) Inventors: Matthew L. Wilhide, Cherry Valley, IL (US); Christopher J. Courtney, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 214 days.

(21) Appl. No.: 15/230,119

(22) Filed: Aug. 5, 2016

(65) Prior Publication Data

US 2018/0076623 A1    Mar. 15, 2018

(51) Int. Cl.
| | | |
|---|---|---|
| B64D 47/00 | (2006.01) | |
| H02J 3/32 | (2006.01) | |
| H02J 4/00 | (2006.01) | |
| H02J 7/00 | (2006.01) | |
| H02J 7/34 | (2006.01) | |

(52) U.S. Cl.
CPC ............... H02J 3/32 (2013.01); B64D 47/00 (2013.01); H02J 4/00 (2013.01); B64D 2221/00 (2013.01); H02J 7/0068 (2013.01); H02J 7/345 (2013.01)

(58) Field of Classification Search
CPC ....... B64D 47/00; B64D 2221/00; H02J 3/32; H02J 4/00; H02J 7/0068; H02J 7/345; A47L 9/2857; A47L 9/2831; A47L 9/2847; A47L 9/2889; H02H 7/06

USPC .......................................................... 307/22
See application file for complete search history.

(56) References Cited

U.S. PATENT DOCUMENTS

| | | | |
|---|---|---|---|
| 6,178,101 B1* | 1/2001 | Shires | H02M 1/4208 323/225 |
| 9,013,066 B2 | 4/2015 | Kojori et al. | |
| 9,197,088 B2 | 11/2015 | Vieillard et al. | |
| 9,935,544 B2* | 4/2018 | Zubieta | H02M 3/158 |
| 9,966,790 B2* | 5/2018 | Bridgelall | H02J 7/345 |
| 2010/0060231 A1* | 3/2010 | Trainor | H01G 11/14 320/103 |
| 2012/0217824 A1* | 8/2012 | Gupta | F03D 7/0272 307/145 |
| 2014/0292303 A1* | 10/2014 | Zubieta | H02M 3/155 323/355 |
| 2014/0300194 A1* | 10/2014 | Carcouet | H02J 7/0014 307/77 |
| 2015/0035360 A1* | 2/2015 | Marbach | H02J 7/0052 307/23 |
| 2015/0183385 A1 | 7/2015 | Iwashima et al. | |
| 2018/0069429 A1* | 3/2018 | Marbach | H02J 7/345 |

* cited by examiner

*Primary Examiner* — Thienvu Tran
*Assistant Examiner* — Brian K Baxter
(74) *Attorney, Agent, or Firm* — Locke Lord LLP; Scott D. Wofsy; Christopher J. Cillié

(57) ABSTRACT

An electrical accumulator arrangement includes a plurality of energy storage modules having source and return leads. The source lead of a first energy storage module is connected to the return lead of a second energy storage module. The return lead of the first energy storage module is electrically isolated from the source lead of the second energy storage module to pulse voltage across rails of a multi-level direct current power bus.

16 Claims, 3 Drawing Sheets

ELECTRICAL ACCUMULATORS FOR MULTILEVEL POWER SYSTEMS

BACKGROUND OF THE INVENTION

1. Field of the Invention

The present disclosure relates to electrical power systems, and more particularly electrical accumulator arrangements for multilevel power systems.

2. Description of Related Art

Vehicles such as aircraft commonly include electrical systems with on-board generator that converts rotational movement within the engines to electrical power. The generated electrical power is used to power on-board electrical components such as flight controls, sensors, or other on-board electrical devices. During standard operation such electrical systems typically accommodate a baseline electrical load, which normally requires a baseline level of electrical power from the on-board generator. When supplemental electrical power is required, such as take-off assists when the motor in the turbine applies torque to the turbine, additional electrical power can be required from the power system, causing a temporary spike in electrical load.

In order to compensate for the temporary load spike, a generator is typically used which is rated at least as high as expected load spikes to the power system. This generally ensures that adequate power can be provided to the on-board electrical devices at all times, including during elevated load spikes. In a typical power generation systems, the physical size of the generator is commensurate with the generator power rating. Consequently, power systems capable of supporting significant load spikes generally employ relatively heavy electrical generators.

Such conventional methods and systems have generally been considered satisfactory for their intended purpose. However, with continuing advancement of the more electric aircraft, there remains a need for improved aircraft electrical systems. The present disclosure provides a solution for this need.

SUMMARY OF THE INVENTION

An electrical accumulator arrangement includes a plurality of energy storage modules (ESM) having source and return leads. The source lead of a first ESM is connected to the return lead of a second ESM and the return lead of the first ESM is electrically isolated from the source lead of the second ESM to pulse voltage across rails of a multi-level direct current (DC) power bus.

In certain embodiments, the source lead of the first ESM is connected to the neutral rail of the multi-level DC power bus. The return lead of the first ESM is connected to the negative rail of the multi-level DC power bus. The return lead of the first ESM can be connected to the negative rail. The multi-level DC power bus can include a positive rail. The source lead of the second ESM can be connected to the positive rail.

In accordance with certain embodiments, voltage across source lead and the return lead of either or both the ESMs can be more than 270 volts, e.g., 540 volts or higher. One or more of the first ESM and the second ESM can include a high-capacity battery power source. One or more of the first ESM and the second ESM can include a high-capacity non-battery power source. One or more of the first ESM and the second ESM can include both a high-capacity battery power source and a high-capacity non-battery power source, such as an ultracapacitor, a fuel cell, and/or a flywheel arrangement.

It is also contemplated that, in accordance with certain embodiments, a controller can be operatively connected to the first ESM and the second ESM. The controller can be configured to apply a voltage across the source lead and the return lead of the first ESM. The controller can be configured to apply a voltage across the source lead and the return lead of the second ESM in concert with the voltages applied by the first ESM.

A power distribution system includes a multilevel DC bus, a first ESM, and a second ESM as described above. The multilevel DC bus includes a negative rail, a neutral rail electrically isolated from the negative rail, and a positive rail electrically isolated from the neutral rail. The source lead of the first ESM is connected to the neutral rail. The return lead of the first ESM is connected to the negative rail. The source lead of the second ESM is connected to the neutral rail. The return lead of the second ESM is connected to the positive rail.

In certain embodiments, a generator can be connected to the multilevel DC bus. The generator can have a peak capacity. A load can be connected to the multilevel DC bus. The load can have a peak power requirement. The peak power requirement of the load can exceed the peak capacity of the generator. The voltage between the negative rail and the neutral rail can have a magnitude that is about 270 volts. The voltage between the neutral rail and the positive rail can have a magnitude that is about 270 volts. In certain embodiments, the voltage between the neutral rail and the positive rail can be have a magnitude that is greater than +/−270 volts, e.g., 540 volts or higher. It is contemplated that the controller can apply a voltage across the negative rail and the neutral rail using the first ESM in concert with a voltage applied across the neutral rail and the positive rail by the second ESM.

A method of applying voltage to a multilevel DC power bus includes applying voltage across a positive rail and a neutral rail using a generator, applying voltage across the neutral rail and a negative rail using the generator, and pulsing voltage across the negative rail and the neutral rail using an ESM. In embodiments, the method also includes pulsing voltage across the neutral rail and the positive rail using a second ESM. Voltage can be pulsed from the first ESM and the second ESM in concert with one another. The first ESM can be charged using a negative voltage applied to the ESM by the negative rail and the neutral rail. The second ESM can be charged using a positive voltage applied to the second ESM by the neutral rail and the positive rail.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
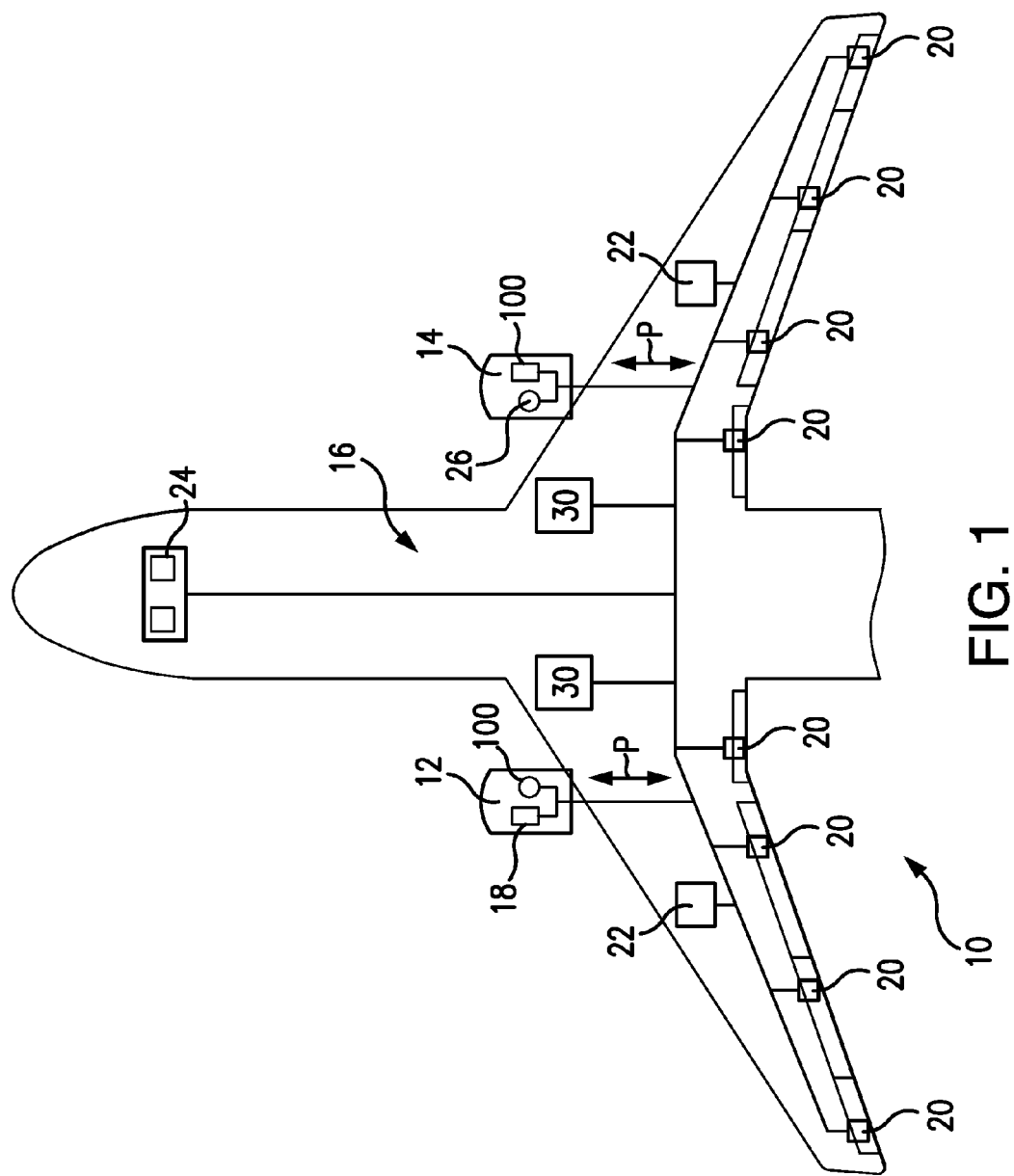
FIG. 1 is a schematic view of an exemplary embodiment of an electrical accumulator arrangement constructed in accordance with the present disclosure, showing the electrical accumulators connected to a power distribution system.

Reference will now be made to the drawings wherein like reference numerals identify similar structural features or aspects of the subject disclosure. For purposes of explanation and illustration, and not limitation, a partial view of an exemplary embodiment of an electrical accumulator arrangement in accordance with the disclosure is shown in FIG. 1 and is designated generally by reference character 100. Other embodiments of electrical accumulator arrangements, power distribution systems, and methods applying voltage to power distribution systems in accordance with the disclosure, or aspects thereof, are provided in FIGS. 2 and 3, as will be described. The systems and methods described herein can be used for vehicular power distribution systems such as in aircraft, though the present disclosure is not limited aircraft or to vehicular power systems in general.

Referring to FIG. 1, an aircraft 10 is shown. Aircraft 10 has a first gas turbine 12, a second gas turbine engine 14, and a power distribution system 16. A generator 18 is operatively connected to first gas turbine engine 12 and receives mechanical rotation from first gas turbine engine 12. Generator 18 generates electrical power P using the mechanical rotation received from first gas turbine engine 12 and applies the electrical power P to power distribution system 16. Power distribution system 16 in turn provides electrical power P to one or more electrical loads carried by aircraft 10. Examples of electrical loads carried by aircraft 10 include one or more flight control surface actuators 20, one or more flight-critical loads 22, and one or more non flight-critical loads 24, each of which are electrically connected to power distribution system 16.

Second gas turbine engine 14 is similar in arrangement to first gas turbine engine 12 and is operatively connected to a generator 26. Generator 26 is electrically connected to power distribution system 16 for converting received mechanical rotation from second gas turbine engine 14 into electrical power for application to power distribution system 16. Although exemplary aircraft 10 is shown having a two gas turbine engines, it is to be understood and appreciated that embodiments of aircraft 10 can have fewer or more gas turbine engines. Further, second gas turbine engine 14 may be an auxiliary power unit (APU) carried by aircraft 10.

As also shown in FIG. 1, aircraft 10 also includes one or more electrical accumulator arrangement 100. Electrical accumulator arrangement 100 is electrically connected to power distribution system 16 and is arranged to both receive electrical power from power distribution system 16 (or provide electrical power to power distribution system 16) according to the power requirements imposed on power distribution system 16 by the electrical loads carried by aircraft 10. In this respect, it is contemplated that generator 18 have a generating capacity, one or more of the electrical loads have a peak (i.e. spike) demand, and that the peak power requirement of an exemplary load 30 exceed that of the generating capacity of generator 18. In such circumstance electrical accumulator arrangement 100 provides pulse electrical power to power distribution system 16 to meet, e.g., supplement, the peak power requirement imposed on power distribution system 16 by load 30.

Figure 2:
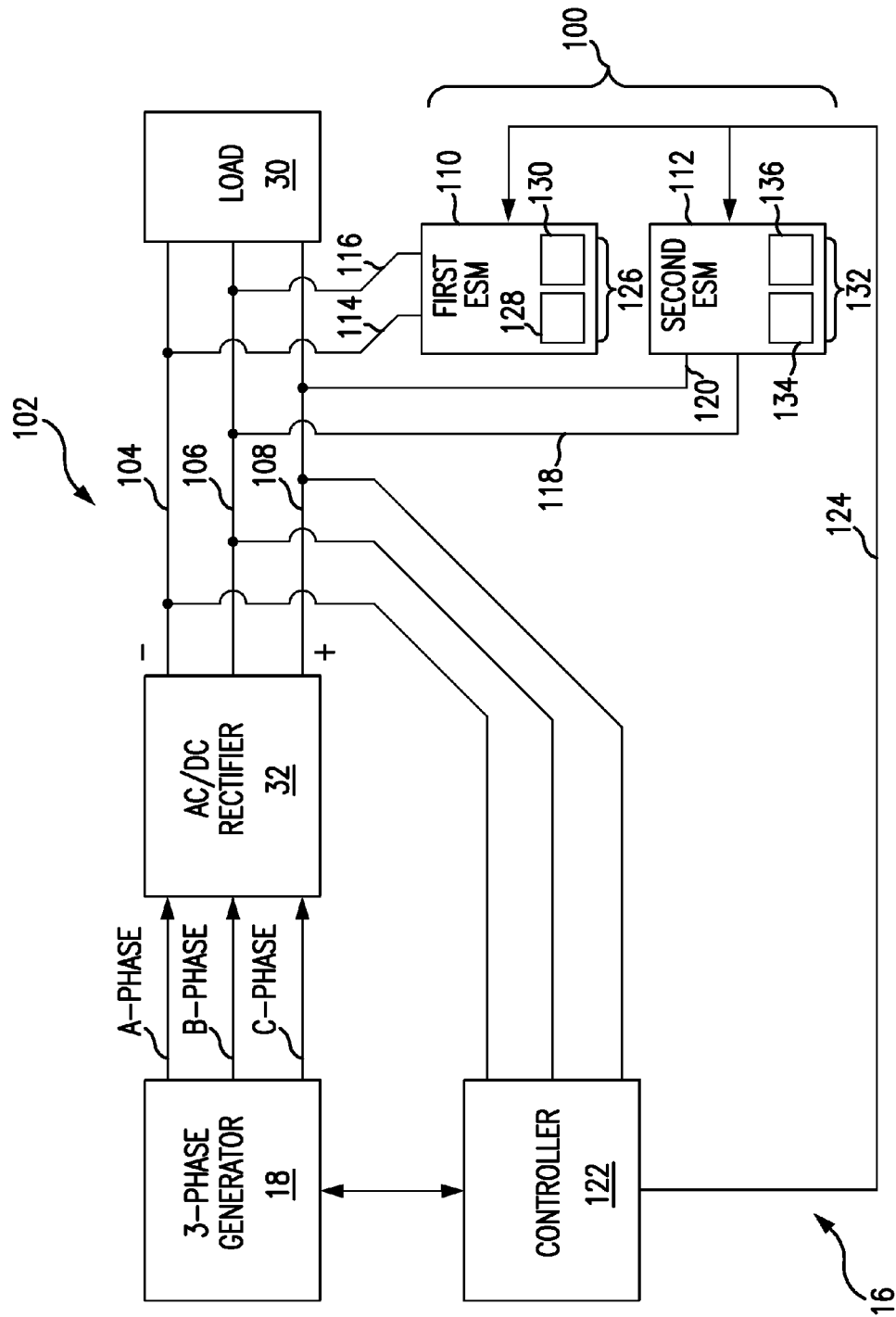
FIG. 2 is a schematic view of the power distribution of FIG. 1, showing a first electrical storage module and a second electrical storage module connected to a multilevel DC power bus of the power distribution system.

With reference to FIG. 2, power distribution system 16 is shown. Power distribution system 16 includes a multilevel direct current (DC) power bus 102. Generator 18, which in the illustrated exemplary embodiment is a three-phase alternating current (AC) power generator, is connected an AC to DC converter (i.e. a rectifier) 32. AC to DC converter 32 is in turn connected to load 30 through multilevel DC power bus 102.

Multilevel DC power bus 102 includes a negative rail 104, a neutral rail 106, and a positive rail 108. Neutral rail 106 is electrically isolated from negative rail 104. Positive rail 108 is electrically isolated from neutral rail 106. AC to DC converter 32 applies a negative voltage across negative rail 104 and neutral rail 106 with a magnitude that is about 270 volts. AC to DC converter 32 also applies a positive voltage across positive rail 108 and neutral rail 106 that is substantially equivalent to that applied across negative rail 104 and neutral rail 106, e.g., about 270 volts. Although illustrated as a three-level multilevel DC bus, it is to be understood and appreciated that multilevel DC bus 102 can have more than three levels. It is also to be understood and appreciated that the illustrated exemplary architecture could be used with architectures having voltages greater that 270 volts, for example with 540 volts and greater.

Electrical accumulator module 100 includes a first energy storage module (ESM) 110 and a second ESM 112. First ESM 110 and second ESM 112 both includes source leads and return leads and are configured to apply (or receive) voltage to pair of bus rails equivalent to single level of multilevel DC power bus 102. In this respect first ESM 110 has a return lead 114 and a source lead 116, and second ESM 112 has a return lead 118 and a source lead 120. Source lead 116 of first ESM 110 is electrically connected to return lead 118 of second ESM 112. Return lead 114 of first ESM 110 is electrically isolated from source lead 120 of second ESM 112.

As shown in FIG. 2, return lead 114 of first ESM 110 is connected to negative rail 104 of multilevel DC power bus 102. Source lead 116 of first ESM 110 is connected to neutral rail 106 of multilevel DC power bus 102, and therethrough to return lead 118 of second ESM 112. Source lead 120 of second ESM 112 is connected to positive rail 108 of multilevel DC power bus 102. Return lead 118 of second ESM 112 is connected to neutral lead 106 of multilevel DC power bus 102, and therethrough to source lead 116 of first ESM 110.

A controller 122 is operably connected to first ESM 110 and second ESM 112. Controller 122 is also communicative with multilevel DC bus 102, e.g., through one or more current or voltage sensors, and may further be operatively connected with generator 18 for purposes of understanding the actual load on generator 18. As illustrated in FIG. 2, controller 122 is operably connected to first ESM 110 and second ESM 112 through a control lead 124. Therethrough, controller 122 causes voltage to a applied across the respective source and return leads of first ESM 110 and second ESM 112 in concert with one another, such as by opening and closing solid-state switch devices connected to a hybrid energy supply module (HESM) 126 disposed within first ESM 110 and a HESM 132 disposed within second ESM 112. Examples of such devices and related methods are described in U.S. Patent Application Publication No. 2012/

0043822 A1 to Swenson et al., published on Feb. 23, 2012, the contents of which is incorporated herein in its entirety.

HESM 126 includes a high-capacity battery power source 128 and a high-capacity non-battery power source 130. It is contemplated that high-capacity non-battery power source 130 can include an ultracapacitor. High-capacity non-battery power source 130 has the advantage of cyclic tolerance. In this respect, use of a high-capacity non-battery power source 130 allows for first ESM 110 to provide pulsed energy in response to periodic spikes in the power requirement of load 30, the high-capacity non-battery power source charging rapidly during intervals between the periodic load spikes. HESM 132 is similar in arrangement to HESM 126, may include a high-capacity battery power source 134 and a high-capacity non-battery power source 136, and differs in connection with multilevel DC bus 102, as described above, and slaving to HESM 126 through controller 122 for concerted discharging and/or charging with HESM 126.

As will be appreciated by those of skill in the art in view of the present disclosure, this arrangement allows first ESM 110 and second ESM 112 to apply voltage to different pairs of rails of multilevel DC bus 102 when load spikes from load 30 exceed the generating capability of generator 18. As will also be appreciated by those of skill in the art in view of the present disclosure, responding to load spikes with first ESM 110 and second ESM 112 instead of generator 18 allows generator 18 to be less massive than otherwise would be required, reducing the weight and space requirements imposed by power distribution system 16 on the vehicle mounting the system, e.g., aircraft 10 (shown in FIG. 1).

Figure 3:
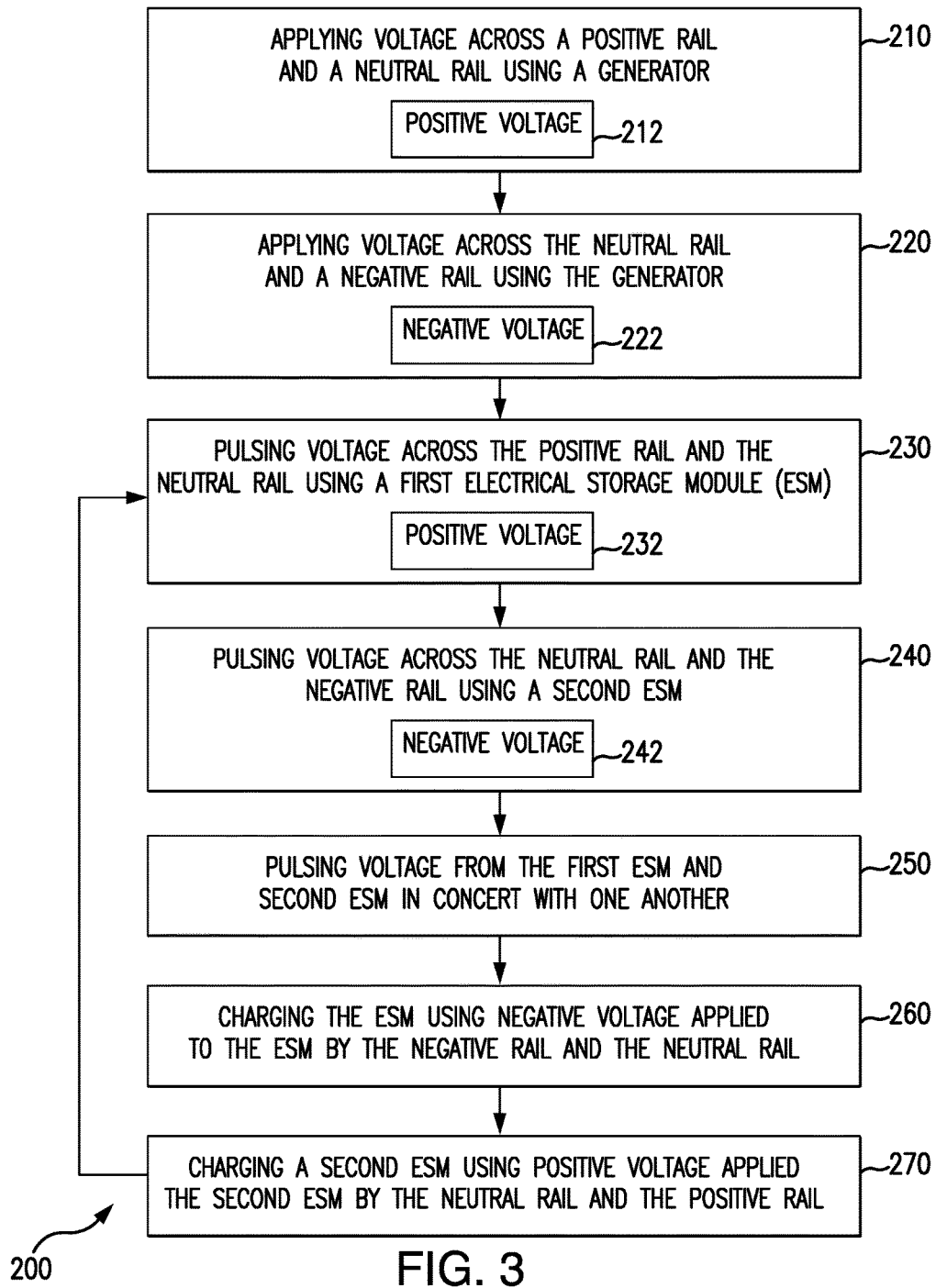
FIG. 3 is block diagram of a method of applying voltage to a multilevel DC power bus, showing operations of the method.

With reference to FIG. 3, a method of applying voltage to a multilevel DC bus 200 is shown. Method 200 includes applying voltage across a positive rail, e.g., positive rail 108 (shown in FIG. 2), and a neutral rail, e.g., neutral rail 106 (shown in FIG. 2), as shown with box 210. The voltage is applied using a generator, e.g., generator 18 (shown in FIG. 2). The voltage applied across the positive and negative rails is a positive voltage, as shown with box 212.

Method 200 also includes applying voltage across the neutral rail and a negative rail, e.g., negative rail 104 (shown in FIG. 2), using the generator, as shown in box 220. The voltage applied across the neutral rail and the negative rail is a negative voltage, as shown in box 222, and has equal magnitude (and opposite polarity) of the voltage applied across the positive rail and neutral rail by the generator.

Responsive to a load spike from an electrical load connected to the multilevel DC bus, e.g., from electrical load 30 (shown in FIG. 1), voltage pulses are applied to the multilevel bus to accommodate the load spike. The pulse is of relatively short duration, e.g., short enough to discharge an ultracapacitor, and frequent, e.g., rapid enough to potentially damage some kinds of batteries. In this respect a voltage pulse is applied across the positive rail and the neutral rail, as shown by box 230, and a voltage pulse is applied across the neutral rail and the negative rail, as shown by box 240. The pulse applied across to the positive rail and the negative rail can be applied by a first ESM coupled thereto, e.g., first ESM 110 (shown in FIG. 2), as also shown in box 230, and may be of positive voltage as shown with box 232. The pulse applied across to the neutral rail the negative rail can be applied by a second ESM coupled thereto, e.g., second ESM 112 (shown in FIG. 2), as also shown in box 242, and may be of negative voltage as shown in box 242. It is contemplated that the voltage pulses can be applied in concert to the respective rails, as shown with box 250. As will be appreciated by those of skill in the art in view of the present disclosure, concerted application of the pulses can maintain the midpoint balance of the multilevel DC bus.

Upon cessation of the load spike and the associated application of the voltage pulses, the first ESA and the second ESM can be charged by multilevel DC bus. For example, the first ESM can be charged using a negative voltage applied to the ESM by the negative rail and the neutral rail, as shown with box 260. The second ESM can be charged using g positive voltage applied the second ESM by the neutral rail and the positive rail, as shown with box 270. As will appreciated, charging events can take place between pulsing events, as indicated by arrow 280.

With increasing electrical power demands, electrical architectures are increasingly moving from two-rail arrangements to three-rail arrangements with positive and negative to common rails of +/−270 volts, +/−540 voltage, etc. Such architectures can provide electrical devices connected to the systems corresponding to the voltage difference between the positive and negative rails while requiring current carrying components rated to only the voltage between the positive rail or source rail and the neutral rail, thereby providing increased voltage without commensurate increase in the power system conductors. Such architectures can be required to support load spikes from electrical devices connected to the power system, potentially requiring electrical generators of increased size.

In embodiments described herein, the need to accommodate increased load spikes in such power systems is met through the use of a plurality of electrical accumulator modules. In this respect a first electrical accumulator module is connected between the negative rail and the neutral rail, a second electrical accumulator module is connected between the positive rail and the neutral rail, and a controller is operatively connected to the first and second electrical accumulator modules to cause each to apply electrical power to the respective rail pair to accommodate electrical load spikes from electrical devices connected to the rail pairs. Connecting a first electrical accumulator module to a first rail pair and the second electrical accumulator module to a second rail of the power system enables the power system to be serviced by a generator having a generating capability below that of load spike rating of the power system, thereby (a) enabling the power system to support a smaller generator by having the electrical accumulator modules supply pulse power, (b) support emergency mode operation supported by either or both of the electrical accumulator modules, e.g., a battery, and (c) employ ultra capacitors to apply pulse power to the rail pairs, reducing battery stress.

The methods and systems of the present disclosure, as described above and shown in the drawings, provide for power systems with superior properties including increased electrical system load capacity without commensurate increase in electrical generator size. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. An electrical accumulator arrangement, comprising:
   a first energy storage module (ESM) with a first source lead and a first return lead, wherein the first ESM comprises a high-capacity battery power source, and wherein the first ESM comprises a non-battery power source;

a second ESM with a second source lead and a second return lead wherein the second ESM comprises another high-capacity battery power source and an ultracapacitor,
wherein the second return lead of the second ESM is electrically connected to the first source lead of the first ESM and the second source lead of the second ESM is electrically isolated from the first return lead of the first ESM to provide power to a multi-level direct current (DC) power bus during load spike events;
a control lead connected to the first ESM and the second ESM; and
a controller operatively connected to the first ESM and the second ESM through the control lead, wherein the controller is configured apply voltage across the first source lead and the first return lead of the first ESM in concert with application of voltage across the second source lead and the second return lead of the second ESM.

2. The electrical accumulator arrangement as recited in claim 1, further comprising a neutral rail connecting the second return lead of the second ESM with the first source lead of the first ESM.

3. The electrical accumulator arrangement as recited in claim 1, further comprising a negative rail connected to the first return lead of the first ESM.

4. The electrical accumulator arrangement as recited in claim 1, further comprising a positive rail connected to the second source lead of the second ESM.

5. The electrical accumulator arrangement as recited in claim 1, wherein a voltage differential across the first source lead and the first return lead of the first ESM is greater than 270 volts.

6. A power distribution system, comprising:
a multilevel direct current (DC) bus, comprising:
a negative rail;
a neutral rail electrically isolated from the negative rail; and
a positive rail electrically isolated from the neutral rail;
a first electrical storage module (ESM) with a first source lead and a first return lead, wherein the first return lead of the first ESM is connected to the negative rail and the first source lead of the first ESM is connected to the neutral rail; and
a second electrical storage module (ESM) with a second source lead and a second return lead, wherein the second return lead of the second ESM is connected to the neutral rail and the second source lead of the second ESM is connected to the positive rail;
a control lead connected to the first ESM and the second ESM; and
a controller operatively connected to the first ESM and the second ESM through the control lead, wherein the controller is configured apply voltage across the first source lead and the first return lead of the first ESM in concert with application of voltage across the second source lead and the second return lead of the second ESM.

7. The power distribution system as recited in claim 6, wherein the first ESM comprises a high-capacity battery power source and a non-battery power source.

8. The power distribution system as recited in claim 6, further comprising a generator with a peak generating capacity connected to the multilevel DC bus.

9. The power distribution system as recited in claim 8, further comprising a load with a peak power requirement, wherein the load is connected to the multilevel DC bus, wherein the peak power requirement of the load is greater than the peak generating capacity of the generator.

10. The power distribution system as recited in claim 8, further comprising a controller operatively connected to the first ESM and the second ESM and configured to apply voltage across the negative rail and the neutral rail with the first ESM in concert with voltage applied by the second ESM across the neutral rail and the positive rail.

11. The power distribution system as recited in claim 8, wherein a voltage between the negative rail and the neutral rail is greater than 270 volts.

12. A method powering a direct current (DC) multilevel bus, comprising:
applying voltage across a negative rail and a neutral rail using a generator;
applying voltage across the neutral rail and a positive rail using the generator; and
pulsing voltage across the negative rail and the neutral rail using an electrical storage module (ESM) with a controller operatively connected to the ESM by a control lead to limit stress on a battery of the ESM by applying voltage pulses from a capacitor of the ESM.

13. The method as recited in claim 12, wherein the ESM is a first ESM, the method further comprising pulsing voltage across the neutral rail and the positive rail using a second ESM.

14. The method as recited in claim 12, wherein the ESM is first ESM, the method further comprising pulsing voltage from the first ESM and second ESM in concert with one another.

15. The method as recited in claim 12, further comprising charging the ESM using negative voltage applied to the ESM by the negative rail and the neutral rail.

16. The method as recited in claim 12, wherein the ESM is a first ESM, and further comprising charging a second ESM using positive voltage applied the second ESM by the neutral rail and the positive rail.

* * * * *